3,847,867
POLYETHERIMIDES
Darrell R. Heath, Pittsfield, Mass., and Joseph G. Wirth, Schenectady, N.Y., assignors to General Electric Company, Schenectady, N.Y.
No Drawing. Continuation-in-part of application Ser. No. 108,151, Jan. 20, 1971, now Patent No. 3,787,475. This application Dec. 29, 1972, Ser. No. 319,327
Int. Cl. C08g 20/32
U.S. Cl. 260—47 CP                     30 Claims

ABSTRACT OF THE DISCLOSURE

Polyetherimides are provided by effecting reaction between certain aromatic bis(etheranhydride) and organic diamine. The polyetherimides can be reinforced with various fillers to produce high performance composites.

This application is a continuation-in-part of application Ser. No. 108,151, filed Jan. 20, 1971, now U.S. Pat. 3,787,475, and assigned to the same assignee as the present invention.

The present invention relates to polyetherimides with are made by reacting certain bis(etherdianhydride) and organic diamine.

The polyetherimides of the present invention consist essentially of the following chemically combined units, (1) 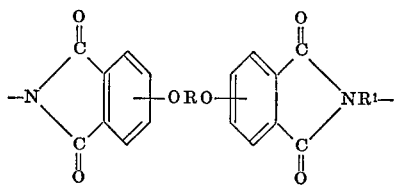

where R is a member selected from the class consisting of (a) the following divalent organic radicals:

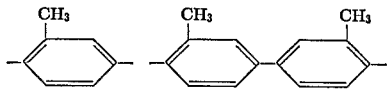

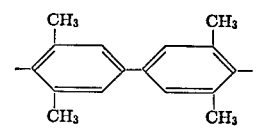

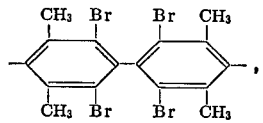

and

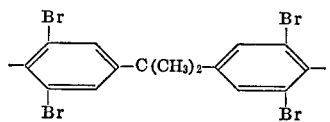

and (b) divalent organic radicals of the general formula

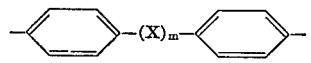

where X is a member selected from the class consisting of divalent radicals of the formulas,

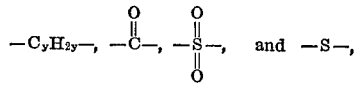

where $m$ is 0 or 1, $y$ is a whole number from 1 to 5, and the divalent bonds of the —O—R—O— radical are equally situated on the phthalic anhydride end groups, e.g., in the 3,3'-positions or the 4,4'-positions, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms $C_{(2-8)}$ alkylene terminated polydiorganosiloxane, and (c) divalent radicals included by the formula,

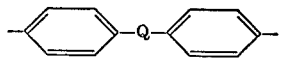

where Q is a member selected from the class consisting of

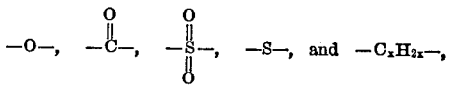

and $x$ is a whole number from 1 to 5 inclusive.

A preferred class of polyetherimides which are included by formula (1) are polymers consisting essentially of from about 2 to 5000 units and preferably 2 to 100 of the formula (2) 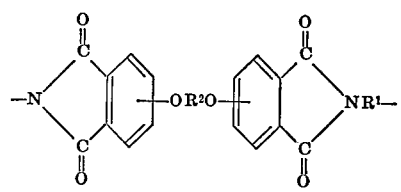

where $R^1$ is previously defined, and $R^2$ is

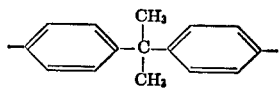

Included by the polyetherimides of formula (2), are polymers consisting essentially of the following chemically combined units, (3) 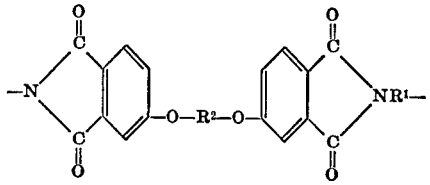

(4) 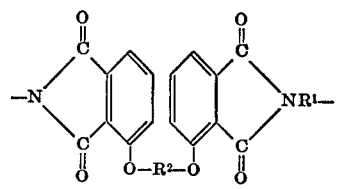

(5) 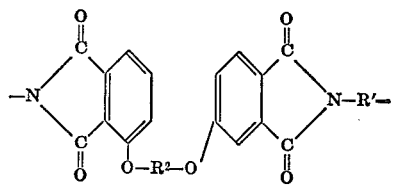

and mixtures thereof, where $R^1$ and $R^2$ are defined above.

The polyetherimides of formulas 1–5 can be made by effecting reaction between aromatic bis(etheranhydride) of the formula, (6)

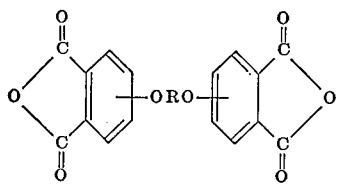

and organic diamine of the formula, (7)     $H_2NR^1NH_2$ where R and $R^1$ are as previously defined.

There can be employed from 0.5 to 2 moles of aromatic bis(etheranhydride) per mole of organic diamine. It is preferred to employ substantially equal molar amounts of bisanhydride and diamine.

The aromatic bis(etheranhydride) of formula (6), and organic diamine of formula (7) can be stirred in the presence of a dipolar aprotic organic solvent under ambient conditions to produce a polyamide acid. Depending upon the solids content of the polyamide acid solution, reaction time can vary between a few minutes or less to an hour or more. At the completion of the reaction, the solution can be cast on a substrate to facilitate the removal of organic solvent. The cast polyamide acid film can be heated to an elevated temperature in a step-wise manner. After the initial heat treatment which can be, for example, up to 150° C. or higher, the film can be heated to a higher temperature, for example, 200° C.–300° C. for an hour or more to convert the polyamide acid to the polyimide state. Experience has shown that polyetherimide made from polyamide acid produced at "ambient temperatures" is generally insoluble in organic solvents. It can be employed as a wire coating enamel and impart solvent resistant properties to various substrates.

In addition to the above "ambient temperature method," another method which can be employed to make polyetherimide consisting essentially of chemically combined units of formula (1) is the "high temperature method," shown by copending application Ser. No. 319,371 of Tohru Takekoshi and John Kochanowski filed concurrently herewith and assigned to the same assignee as the present invention. Reaction is effected between the aromatic bis(etheranhydride) of formula (6) and the organic diamine of formula (7) in the presence of an organic solvent at temperatures of at least 130° C. Water of reaction is removed to facilitate polyetherimide formation. A mixture of a low boiling and higher boiling solvent also can be used which serves as an azeotroping agent.

Suitable organic solvents for making the polyetherimide reaction products by the high temperature method are any organic solvent and materials thereof boiling between 110° C. to 400° C. and inert to the polyetherimide. Solvents included are for example benzene, toluene, xylene, chlorobenzene, dichlorobenzene, etc.

The above polyetherimide reaction products of aromatic bis(etheranhydride) of formula (6) and organic diamine of formula (7) made by the high temperature method are soluble in organic solvents and can be cast from an organic solvent solution to a thermoplastic film. These polyetherimides can be molded at temperatures up to 500° C. A preferred class of injection moldable materials are polyetherimide reaction products of organic diamine of formula (7) and aromatic bis(etheranhydride) of formula (6) where R is defined as $R^2$. These injecting moldable materials can be molded at temperatures of between 200° C. to 400° C. and are soluble in organic solvents such as methylene chloride, chloroform, N,N-dimethylformamide, N,N-dimethylacetamide, etc.

The aromatic bis(etheranhydride)s of formula (6) are shown in copending application of Darrell Heath and Joseph Wirth, Ser. No. 281,749, filed Aug. 18, 1972, and assigned to the same assignee as the present invention. These dianhydrides can be prepared from the hydrolysis, followed by dehydration, of the reaction product of a nitro-substituted phenyl dinitrile with a metal salt of a dihydric aryl compound in the presence of a dipolar aprotic solvent. For example, a benzenoid compound of the formula,

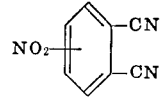

where the $NO_2$ group can be positioned anywhere on the benzene ring, can be reacted in dimethylformamide, with alkali metal salt of a dihydric phenol of the general formula, Alk—O—R'—O—Alk where R' is a divalent aromatic radical and alk is an alkali metal ion. Various well known procedures can be used to convert the resulting tetranitriles to the corresponding tetra acid and dianhydrides.

Included by the alkali metal salts of the above described dihydric phenols are sodium and potassium salts of the following dihydric phenols:

2,2-bis-(2-hydroxyphenyl)propane;
2,4'-dihydroxydiphenylmethane;
bis-(2-hydroxyphenyl)-methane;
2,2-bis-(4-hydroxyphenyl)-propane hereinafter identified as "bisphenol-A" or "BPA;"
1,1-bis-(4-hydroxyphenyl)-ethane;
1,1-bis-(4-hydroxyphenyl)-propane;
2,2-bis-(4-hydroxyphenyl)-pentane;
3,3-bis-(4-hydroxyphenyl)-pentane;
4,4'-dihydroxybiphenyl;
4,4'-dihydroxy-3,3',5,5'-tetramethylbiphenyl;
2,4-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide; etc.

Included by the organic diamines of formula (7) are, for example, m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminoaphthalene;
3,3'-dimethylbenzidine;
3,3'-dimethoxybenzidine;
2,4-diaminotoluene; 2,6-diaminotoluene;
2,4-bis(β-amino-t-butyl)toluene;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;

1,4-cyclohexanediamine;
1,12-octadecanediamine;
bis(3-aminopropyl)sulfide;
N-methyl-bis(3-aminopropyl)amine;
hexamethylenediamine;
heptamethylenediamine; 2,4-diaminotoluene;
nonamethylenediamine; 2,6-diaminotoluene;
bis-(3-aminopropyl)tetramethyldisiloxane, etc.

The polyetherimides of formula (1) can be reinforced with various particulated fillers such as glass fibers, silica fillers, carbon whiskers, up to 50% by weight of the resulting total blend. Reinforcement of polymer can be accomplished prior to polymer formation by effecting polymerization in the presence of filler. Melt blending and solution blending also can be employed.

In order that those skilled in the art will be able to practice the invention, the following examples are given by way of illustration and not by way of limitation. All parts are by weight.

EXAMPLE 1

A mixture of 4,4′-diaminodiphenylether (41.488 parts) and 2,2-bis[4-(2,3-dicarboxyphenoxy)phenyl]propane dianhydride (110.00 parts), diphenylether (1500 parts) and toluene (150 parts) was stirred and heated to reflux for five hours under a nitrogen atmosphere. In the course of the reaction, water was removed by azeotropic distillation. The cooled reaction mixture was poured into methanol to isolate the product. The yield was 149.7 parts. The intrinsic viscosity was .33 dl./g. in dimethylformamide. The glass transition temperature was 241° C. as determined by thermal optical analysis. The identity of the polymer was confirmed by its infrared spectrum: $\lambda_{max.}$ 1769, 1712, 1380 and 1250 cm.$^{-1}$. The thermal decomposition temperature was 480° C. in nitrogen and 410° C. in air or determined by thermal gravimetric analysis. The material was extruded with a screw blade extruder. The extruded pellets were extrusion molded at 300° C. and 5000 p.s.i. The molded samples had a yield strength of 13,700 p.s.i. and ultimate elongation of 12.4%. By method of preparation the polymer has the following structure:

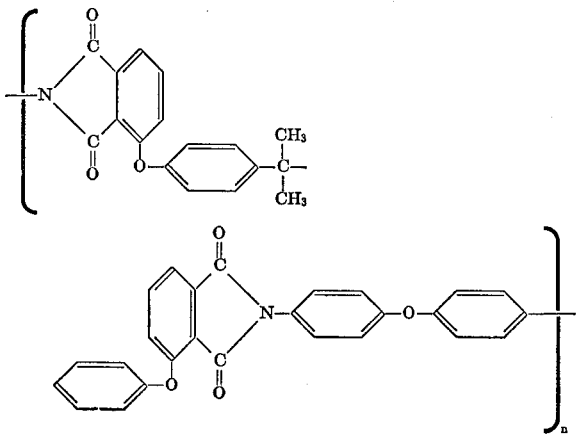

where $n$ is a positive integer greater than 1.

EXAMPLE 2

A mixture of 4,4′methylenedianiline (37.344 parts) and 2,2-bis[4-(2,3-dicarboxyphenoxy)phenyl]propane dianhydride (100.0000 parts), orthodichlorobenzene (1300 parts) and toluene (50 parts) was stirred and heated to reflux for five hours under a nitrogen atmosphere. In the course of the reaction, water formed was removed by azeotropic distillation. Upon cooling, the reaction mixture was poured into methanol to isolate the polymer. The yield was 134.7 parts. The intrinsic viscosity was .41 dl./g. in dimethylformamide. The glass transition temperature was 237° C. as determined by thermal optical analysis. The elemental analysis found was: C, 77.8%; H, 4.5%; N, 4.1%. Calculated for $(C_{44}H_{30}N_2O_6)_n$ is C, 77.4%; H, 4.4%; N, 4.1%. The thermal decomposition temperature of the polymer was 420° C. in nitrogen and 420° C. in air as determined by thermal gravimetric analysis. The polymer was extruded with a screw blade extruder. The extruded pellets were injection molded at 290° C. and 5000 p.s.i. The ultimate strength of the molded press was 10,400 p.s.i. and the elongation was 4.5%.

By method of preparation the structure of the polyetherimide is:

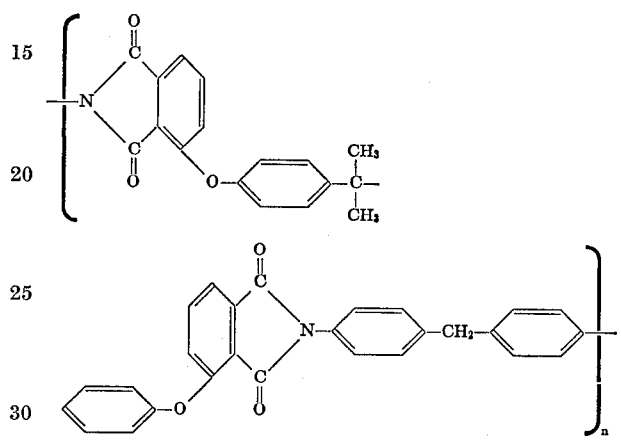

where $n$ is a positive integer greater than 1.

EXAMPLE 3

A mixture of 4,4′diaminodiphenyl ether (20.744 parts) and 2,2-bis[4-(3,4-dicarboxyphenoxy)phenyl]propane dianhydride (55.000 parts) and ortho-dichlorobenzene (750 parts) was stirred and heated to reflux for five hours under a nitrogen atmosphere. In the course of the reaction, water formed was removed by azeotropic distillation. Upon cooling, the reaction mixture was poured into methanol to isolate the product. The yield of the polymer was 72.7 parts. The intrinsic viscosity was .63 dl./g. in dimethylformamide. The number average molecular weight and weight average molecular weight were 63,800 and 18,800 respectively. The glass transition temperature was 221° C. as determined by thermal optical analysis. The infrared spectrum: $\lambda_{max.}$ 1767, 1712, 1372, 1275, 1244 and 1217 cm.$^{-1}$. The elemental analysis found was: C, 75.3%; H, 4.4% and N, 3.8%. Calculated for $(C_{43}H_{28}N_2O_7)_n$ is: C, 75.4%; H, 4.1% and N, 4.1%. The polymer was extruded with a screw blade extruder. Samples were compression molded at 280° C. and 5,000 p.s.i. The tensile strength of the molded sample was 12,400 p.s.i., and the elongation was 9.4%.

By method of preparation, the polymer has the following structure:

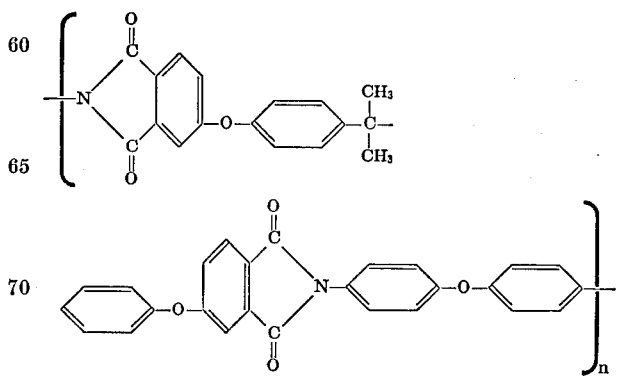

where $n$ is a positive integer greater than 1.

EXAMPLE 4

A mixture of 4,4'methylenedianiline (18.672 parts) and 2,2-bis[4-(3,4-dicarboxyphenoxy)phenyl]propane dianhydride (50.000 parts), and ortho-dichlorobenzene (700 parts) was stirred and heated to reflux for five hours in a nitrogen atmosphere. In the course of the reaction, water formed was removed by azeotropic distillation. Upon cooling, the mixture was poured into methanol to isolate the polymer. The yield was 65.4 parts. The intrinsic viscosity was 48 dl./g. in dimethylformamide. The number average molecular weight and the weight average molecular weight were 26,481 and 71,554, respectively. The glass transition temperature was 214° C. as determined by thermal optical analysis. The infrared spectrum: $\lambda_{max.}$ 1770, 1714, 1352 and 1274 cm.$^{-1}$. The elemental analysis found was: C, 77.9%; H, 4.70%; N, 4.1%. Calculated for $(C_{44}H_{30}N_2O_6)_n$ is: C, 77.4%; H, 4.4%%; N, 4.1%. The polymer was extruded with a screw blade extruder. The extruded pellets were compression molded at 300° C. and 5,000 p.s.i. The ultimate strength was 11,300 p.s.i., and the elongation was 6.7%.

By method of preparation, the structure of the polyetherimide is:

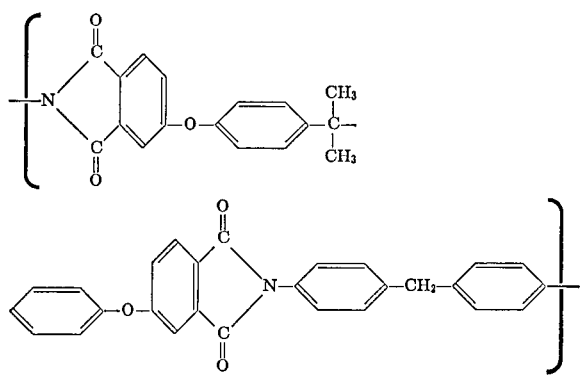

where $n$ is an integer greater than 1.

EXAMPLE 5

A mixture of 2,2-bis[4-(3,4-dicarboxyphenoxy)phenyl] propane dianhydride (3.000 parts), 4,4-diaminodiphenyl ether (1.1520 parts) and dimethylacetamide (45 parts) was stirred at ambient temperature for three hours under a nitrogen atmosphere. The mixture was doctor bladed onto a glass slide to a thickness of one mil. The solvent was evaporated in vacuo. The resulting clear flexible film was cured in vacuo at 275° C. for two hours. The resulting film was insoluble in dimethylacetamide, chloroform, and dimethylsulfoxide. Based on method of preparation, the resulting polyetherimide has the following structure:

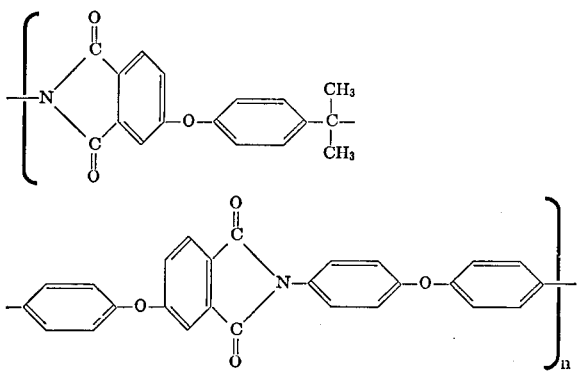

where $n$ is an integer greater than 1.

EXAMPLE 6

A mixture of 2,2-bis[4-(2,3-dicarboxyphenoxy)phenyl] propane dianhydride 3.0000 parts), 4,4'-diaminodiphenyl ether (1.1520 parts) and dimethylformamide (45 parts) was stirred at ambient temperature for two hours under a nitrogen atmosphere. The solution was doctor bladed onto a glass slide to a thickness of a mil. Solvent was evaporated in vacuo. The resulting flexible film was cured at 275° C. in vacuo for two hours. The resulting film was insoluble in dimethylformamide, chloroform and dimethylsulfoxide. Based on method of preparation, the resulting polyetherimide has the following structure:

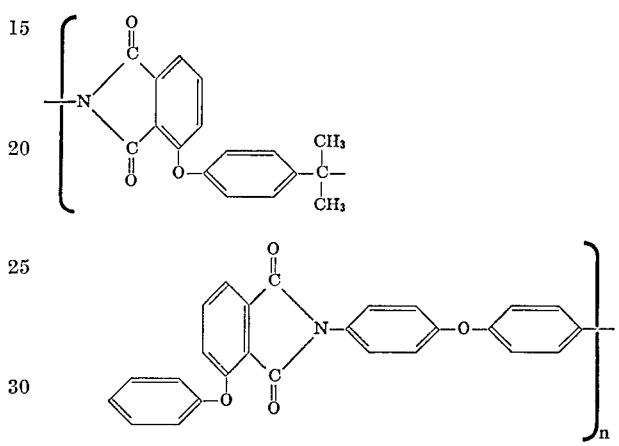

EXAMPLE 7

A mixture of 2,2-bis[4-(2,3-dicarboxyphenoxy)phenyl] propane dianhydride (8.099 parts), 2,4-toluenediamine (1.8628 parts) and orthodichlorobenzene (100 parts) was stirred and heated to reflux for four hours. Upon cooling, the mixture was poured into methanol to isolate the polymer. The yield was 8.80 parts. A clear tough, flexible film was cast from a chloroform solution.

By method of preparation, the polyetherimide has the following structure:

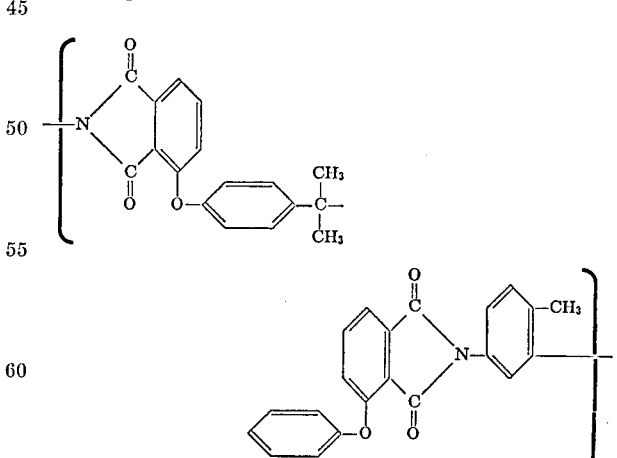

EXAMPLE 8

A mixture of 2,2-bis[4-(2,3-dicarboxyphenoxy)phenyl] propane dianhydride (6.690 parts), hexamethylenediamine (1.494 parts), diphenyl ether (70 parts) and toluene (10 parts) was stirred and heated to reflux for four hours under a nitrogen atmosphere. Upon cooling, the mixture was poured into methanol to isolate the polymer. The yield was 7.9 parts. Elemental analysis gives: C, 74.7%; H, 5.5%. Calculated for $(C_{37}H_{32}N_2O_6)_n$ is C, 74.0%; H, 5.4%. Based on the method of preparation, the structure of the polyetherimide is:

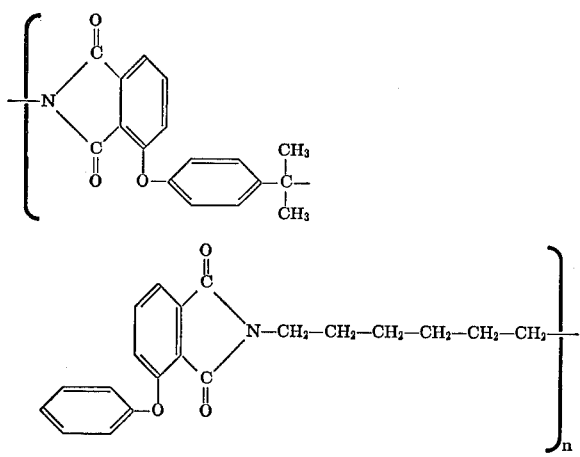

EXAMPLE 9

A mixture of 4,4-bis(3,4-dicarboxyphenoxy)diphenylsulfide dianhydride (2.8457 parts), bis(4-aminobutyl)tetramethyldisiloxane (1.5407 parts), trichlorobiphenyl (mixed isomers) (35 parts) and toluene (5 parts). The mixture was stirred and heated to reflux for four hours. In the course of reaction water formed was removed by azeotropic distillation. Upon cooling, the reaction mixture was poured into methanol to isolate the product. The yield of the polymer was 4.0 parts. The intrinsic viscosity of the polymer was 0.43 dl./g. in meta-cresol. The infrared spectrum: 1762, 1700, 1385, 1205 and 1162 cm.$^{-1}$.

The thermal decomposition temperature of the polymer was 450° C. in nitrogen, and 410° C. in air as determined by thermal gravimetric analysis.

By method of preparation the structure of the resulting polyetherimide is:

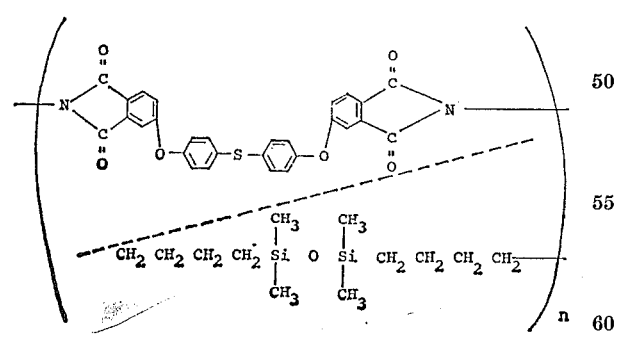

EXAMPLE 10

A mixture of 2,2-bis[4-(3,4-dicarboxyphenoxy)phenyl]propane dianhydride (6.828 parts), methylenedianiline (2.341 parts), bis(3-aminopropyl)tetramethyldisiloxane (0.326 part) and o-dichlorobenzene (60 parts) was heated to reflux (183° C.) for 2.5 hours during which time water formed was removed as an azeotropic mixture. The resulting polymer solution was cooled and poured into methanol to isolate 8.47 parts (93.2%) of polymer. The polymer possessed the intrinsic viscosity of 0.48 dl./g. in chloroform and glass transition temperature of 191° C. as determined by differential scanning calorimetry.

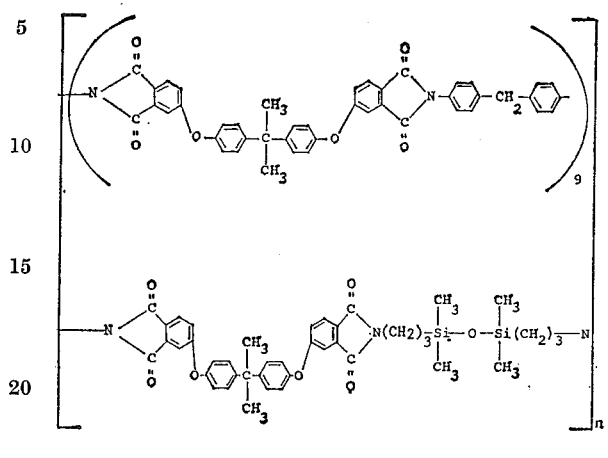

EXAMPLE 11

A mxture of 2,2-bis[4-(3,4-dicarboxyphenoxy)phenyl]propane dianhydride (6.820 parts), bis(3-aminopropyl)tetramethyldisiloxane (3.255 parts) and o-dichlorobenzene (60 parts) was heated to reflux under nitrogen for two hours during which time the water formed was removed by azeotropic distillation. The reaction mixture was poured into isopropanol to isolate a tacky polymer product. The polymer was dissolved in methylene chloride and reprecipitated in isopropanol. The yield of the fibrous polymer product was 8.25 part (85.5%). The intrinsic viscosity of the polymer was 0.38 dl./g. in chloroform and the glass transition temperature was 93° C.

Based on method of preparation the resulting polyetherimide has the following structure:

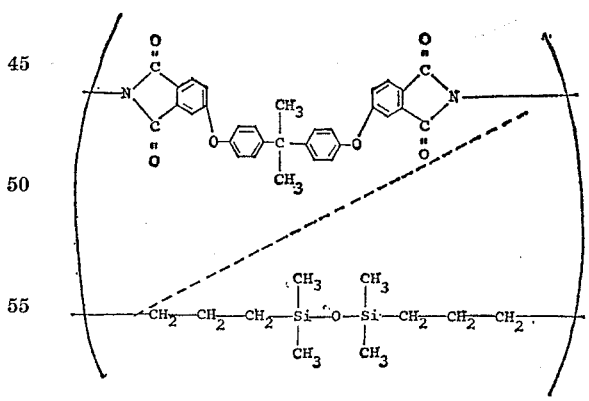

EXAMPLE 12

A mixture of 2,2-bis[4-(3,4-dicarboxyphenoxy)phenyl]propane dianhydride (1.500 parts), 2,2-bis[4-(2,3-dicarboxyphenoxy)phenyl]propane dianhydride (1.500 parts), 4,4'-diaminodiphenyl ether (1.1520 parts), trichlorobenzene (45 parts), and toluene (5 parts) was stirred and heated to reflux for five hours under a nitrogen atmosphere. In the course of the reaction, water formed was removed by azeotropic distillation. Upon cooling, the reaction mixture was poured into methanol to isolate the product. The yield was 3.78 parts. The intrinsic viscosity was .34 dl./g. in dimethylformamide. The infrared spectrum: $\lambda_{max.}$ 1768, 1700, 1360, 1250, 1078 cm.$^{-1}$.

Based on method of preparation the structure of the resulting polyetherimide is:

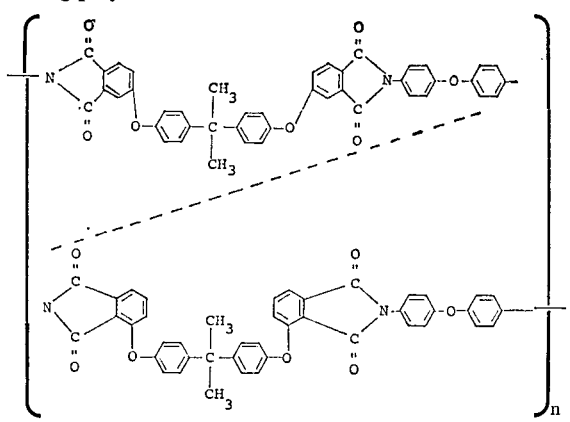

EXAMPLE 13

A mixture of 2,2-bis[4-(2,3-dicarboxyphenoxy)phenyl]propane dianhydride (3.0000 parts), 4,4'-methylenedianiline (1.1418 parts), and dimethylformamide (20 parts) was stirred at ambient temperature for two hours. Upon completion of the reaction, a piece of copper wire was dipped into the reaction mixture. Solvent was evaporated in vacuo. The coated wire was heated to 250° C. for one hour in vacuo. The coating was resistant to chloroform, methylenechloride, water, and dimethylacetamide.

By method of preparation, the polyetherimide had the following structure:

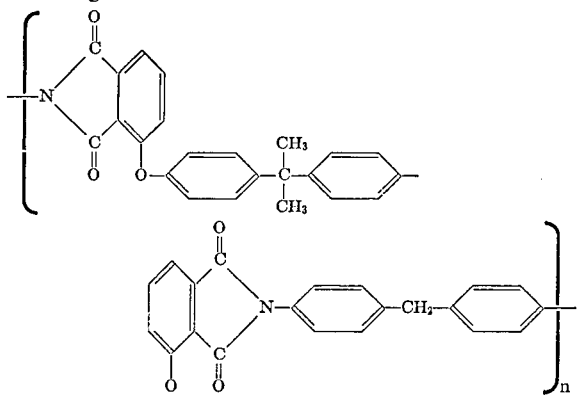

EXAMPLE 14

A mixture of 2,2-bis[4-(2,3-dicarboxyphenoxy)phenyl]propane dianhydride (6.0000 parts), 4,4'-oxydianiline (3.3040 parts), orthodichlorobenzene (90 parts) and toluene (10 parts) was stirred and heated to reflux for four hours. Upon cooling glass, fibers (5.4 parts) were added with stirring. Solvent was removed in vacuo. The resulting glass reinforced polyetherimide has the following structure:

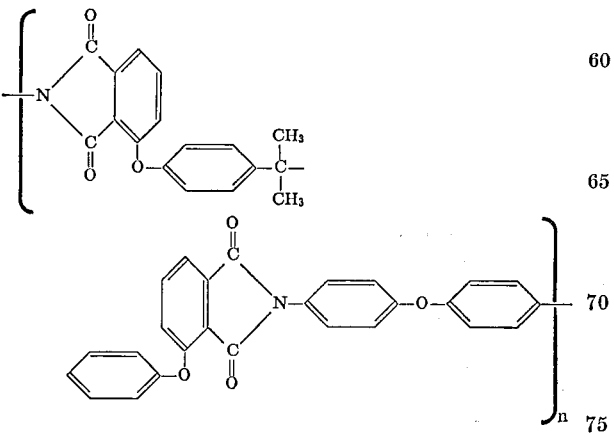

EXAMPLE 15

A mixture of 4-(2,3-dicarboxyphenyl)-4'-(3,4-dicarboxyphenyl) - 2,2 - diphenylpropane dianhydride (5.204 parts), 4,4'-diaminodiphenylmethane (2.002 parts), 50 parts of 1,2,4-trichlorobenzene and 5 parts of toluene was stirred and heated to reflux for four hours. The water formed was continuously removed by azeotropic distillation. The polymer was isolated by pouring the reaction mixture into methanol. The yield of the polymer was quantitative. The structure of the polymer, confirmed by infrared and nuclear magnetic resonance spectra of the chloroform solution is:

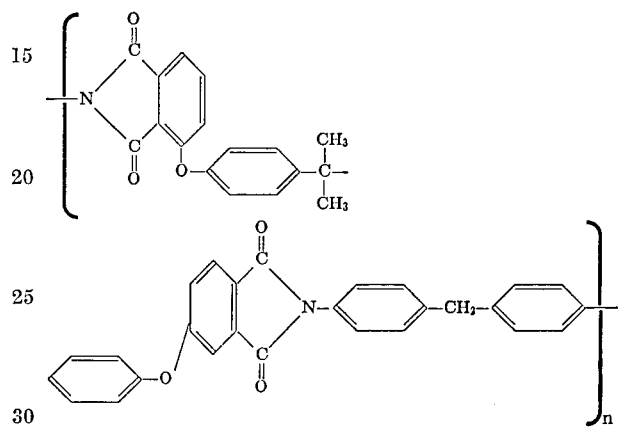

EXAMPLE 16

A mixture of 4,4'-diaminodiphenylmethane (1.9826 parts), approximately one to one mixture of 2,2-bis[4-(2,3-dicarboxyphenoxy)-phenyl]propane dianhydride and 2,2-bis[4-(3,4 - dicarboxyphenoxy) - phenyl]propane dianhydride (5.2047 parts), ortho-dichlorobenzene (60 parts) and toluene (10 parts) was stirred and heated to reflux for four hours under nitrogen atmosphere. In the course of the reaction, water was removed by azeotropic distillation. Upon cooling, the viscous reaction mixture was poured into methanol to isolate the fibrous precipitate of polyetherimide. The yield was 6.43 parts. The polymer was soluble in chloroform, dimethylformamide and metacresol.

The above examples are limited to only a few of the very many polyetherimides which are included by the present invention. For example, the aromatic bis (ether-anhydride) of formula (6) which includes for example,

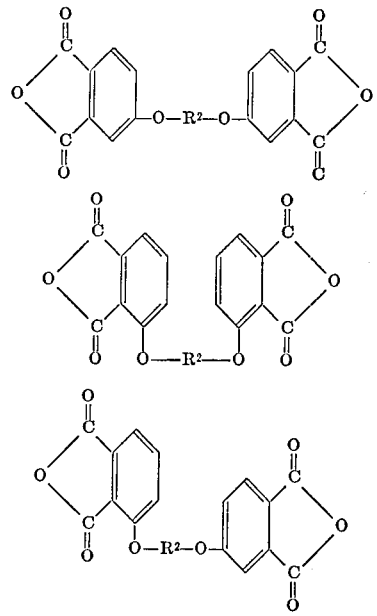

can be reacted with organic diamine of formula (7).

What we claim as new and desire to secure by Letters Patent of the United States is:

1. Polyetherimide consisting essentially of chemically combined units of the formula,

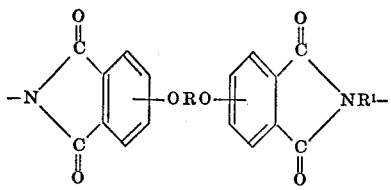

where R is a member selected from the class consisting of (a) the following divalent organic radicals:

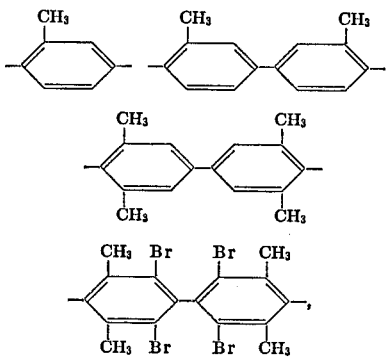

and

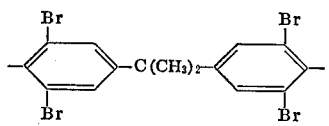

and (b) divalent organic radicals of the general formula,

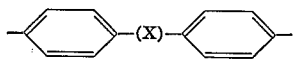

where X is $-C_yH_{2y}-$, $y$ is a whole number equal to from 1 to 5 inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxane, and (d) divalent radicals included by the formula,

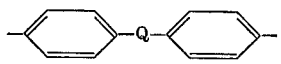

where Q is a member selected from the class consisting of

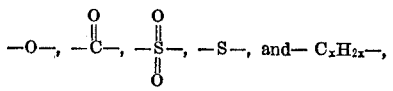

and $x$ is a whole number equal to from 1 to 5 inclusive.

2. Polyetherimide in accordance with claim 1, consisting essentially of the following chemically combined units,

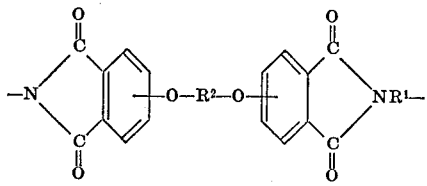

where $R^1$ is as previously defined, and $R^2$ is

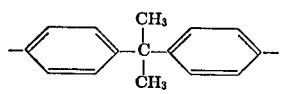

3. A polyetherimide in accordance with claim 2, consisting essentially of the following chemically combined units,

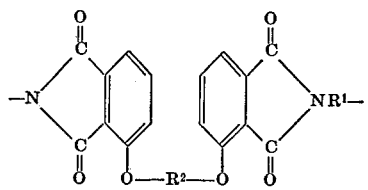

where $R^1$ and $R^2$ are as previously defined.

4. A polyetherimide in accordance with claim 2, consisting essentially of the following chemically combined units,

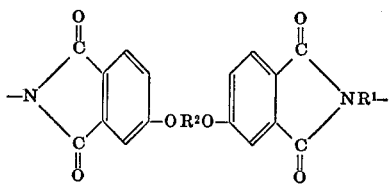

where $R^1$ and $R^2$ are as previously defined.

5. A polyetherimide in accordance with claim 2, consisting essentially of the following chemically combined units,

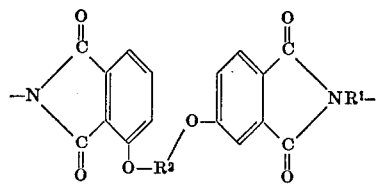

where $R^1$ and $R^2$ are as previously defined.

6. A polyetherimide in accordance with claim 4 having the formula,

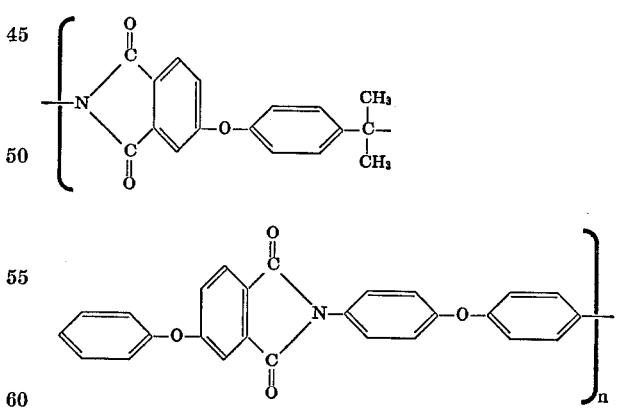

where $n$ is 2 to 100.

7. A polyetherimide in accordance with claim 4 having the formula,

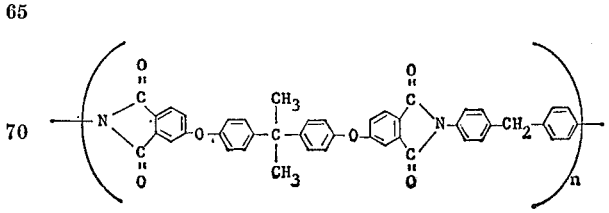

where $n$ is 2 to 100.

8. A polyetherimide in accordance with claim 4 having the formula,

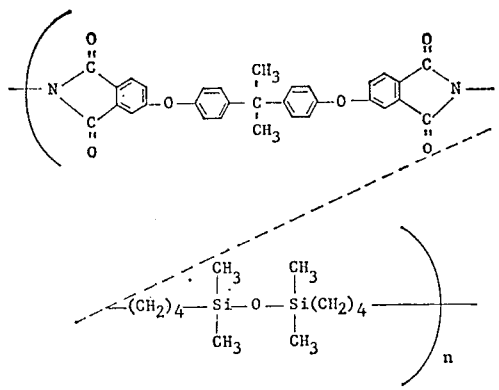

where $n$ is 2 to 100.

9. A polyetherimide in accordance with claim 2 having the formula,

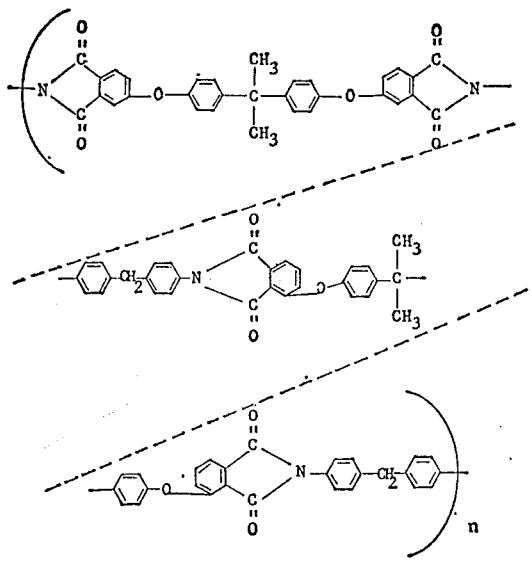

where $n$ is 2 to 100.

10. A polyetherimide in accordance with claim 5 having the formula,

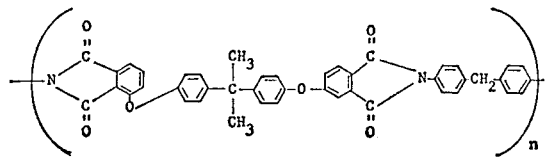

where $n$ is 2 to 100.

11. A polyetherimide in accordance with claim 3 having the formula,

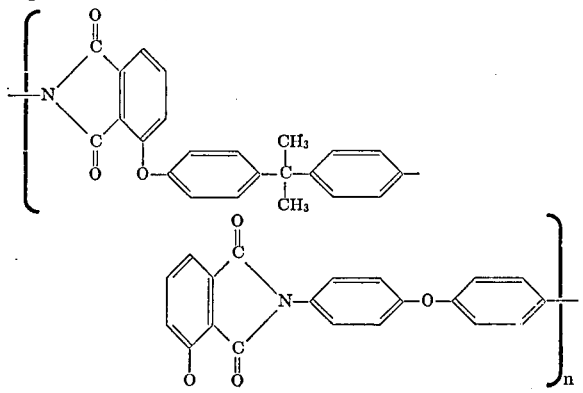

where $n$ is 2 to 100,

12. A polyetherimide in accordance with claim 3 having the formula

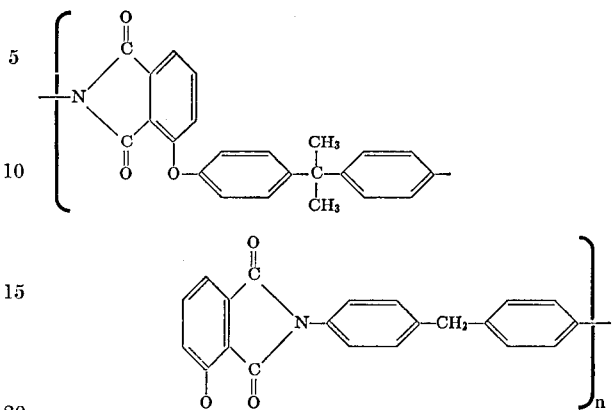

where $n$ is 2 to 100.

13. A moldable polyetherimide consisting essentially of chemically combined units of the formula,

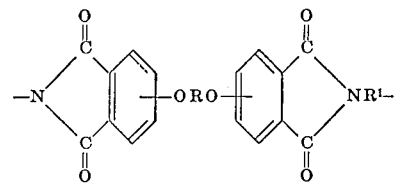

where R and $R^1$ are as previously defined as in claim 1.

14. A moldable polyetherimide in accordance with claim 13 consisting essentially of the following chemically combined units,

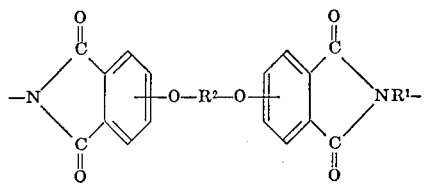

where $R^1$ and $R^2$ are as previously defined in claim 2.

15. A moldable polyetherimide in accordance with claim 13 consisting essentially of the following chemically combined units,

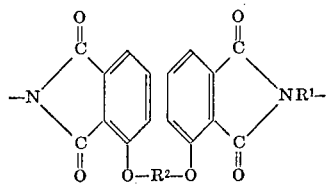

where $R^1$ and $R^2$ are as previously defined as in claim 2.

16. A moldable polyetherimide in accordance with claim 13 consisting essentially of the following chemically combined units,

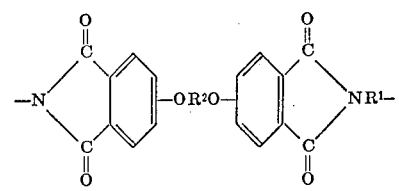

where $R^1$ and $R^2$ are as previously defined as in claim 2.

17. A moldable polyetherimide in accordance with claim 13 consisting essentially of the following chemically combined units,

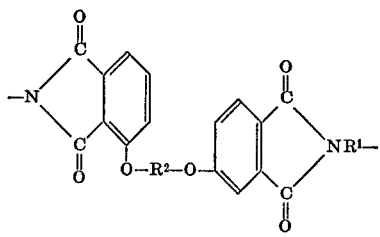

where $R^1$ and $R^2$ are as previously defined.

18. A moldable polyetherimide in accordance with claim 13 consisting essentially of the following chemically combined units,

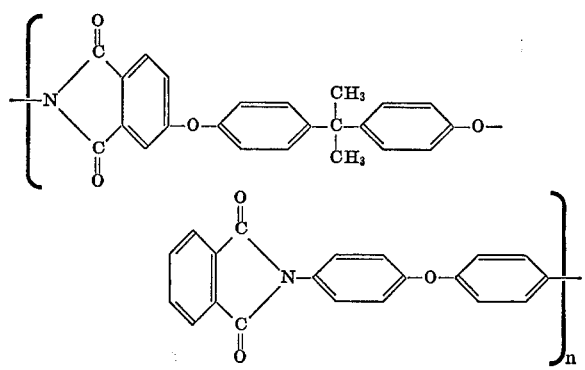

where $n$ is 2 to 100.

19. A moldable polyetherimide in accordance with claim 13 consisting essentially of the following chemically combined units,

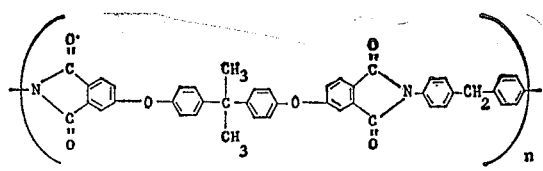

where $n$ is 2 to 100.

20. A moldable polyetherimide in accordance with claim 13 consisting essentially of the following chemically combined units,

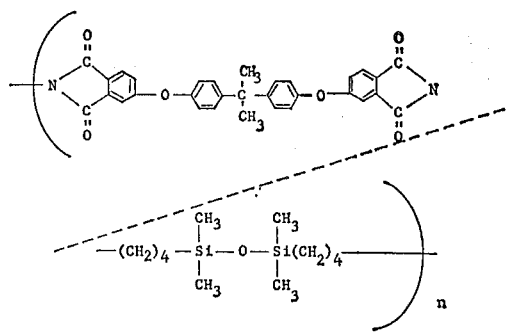

where $n$ is 2 to 100.

21. A moldable polyetherimide in accordance with claim 13 consisting essentially of the following chemically combined units,

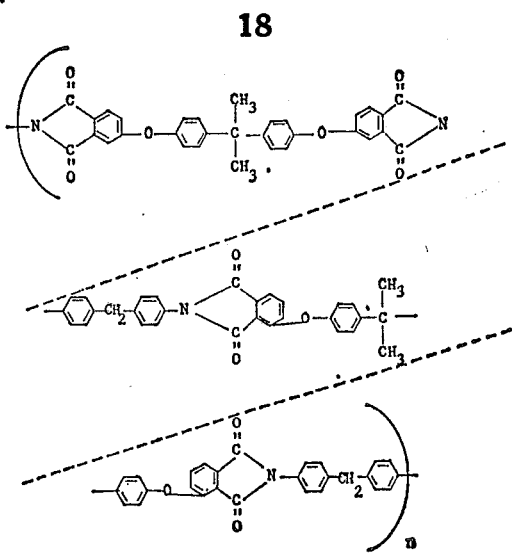

22. A moldable polyetherimide in accordance with claim 13 consisting essentially of the following chemically combined units,

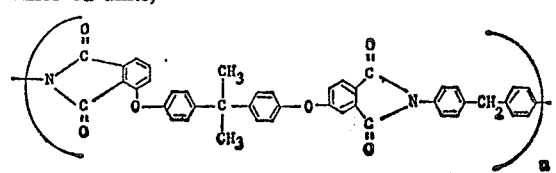

where $n$ is 2 to 100.

23. A moldable polyetherimide in accordance with claim 13 consisting essentially of the following chemically combined units,

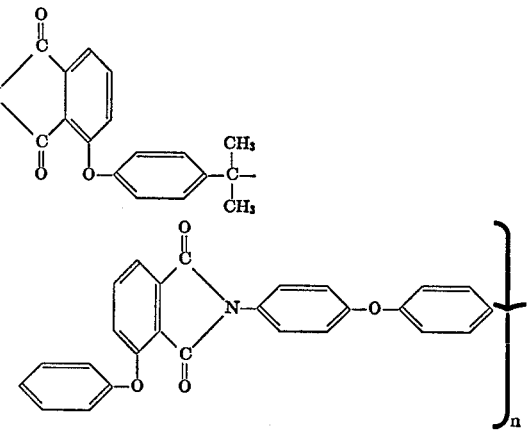

where $n$ is 2 to 100.

24. A moldable polyetherimide in accordance with claim 13 consisting essentially of the following chemically combined units,

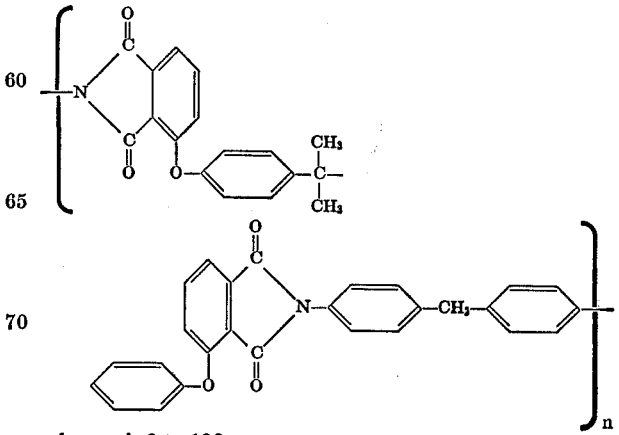

where $n$ is 2 to 100.

25. A wire coating enamel consisting essentially of a dipolar aprotic organic solvent solution of the reaction product under ambient conditions of an organic dianhydride of the formula

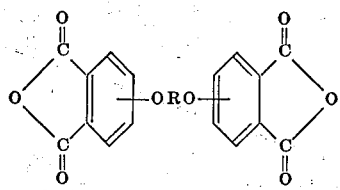

and an organic diamine of the formula

where R and $R^1$ are as previously defined as in claim 1.

26. A wire coating formulation in accordance with claim 13, where R is

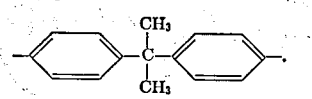

27. A wire coating formulation in accordance with claim 1, where $R^1$ is

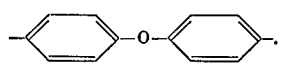

28. A wire coating formulation in accordance with claim 1, where $R^1$ is

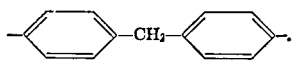

29. A polyetherimide in accordance with claim 1 where $R^1$ is an aromatic hydrocarbon radical derived from metaphenylene diamine.

30. A polyetherimide in accordance with claim 1 where $R^1$ is an aromatic hydrocarbon radical derived from paraphenylene diamine.

References Cited

UNITED STATES PATENTS 3,699,075  10/1972  Lubowitz _____ 260—49

FOREIGN PATENTS

| 224,056 | 6/1968 | U.S.S.R. | 260—47 CP |
| 257,010 | 7/1970 | U.S.S.R. | 260—47 CP |
| 2,155,431 | 8/1972 | Germany | 260—47 CP |

LESTER L. LEE, Primary Examiner

U.S. Cl. X.R.

117—128.4; 260—32.6 N, 33.8 R, 37 N, 49